(12) United States Patent
Kouguchi (10) Patent No.: US 10,203,920 B2
(45) Date of Patent: Feb. 12, 2019

(54) IMAGE FORMING SYSTEM (71) Applicant: KONICA MINOLTA, INC., Chiyoda-ku, Tokyo (JP)

(72) Inventor: Masatsugu Kouguchi, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/621,559

(22) Filed: Jun. 13, 2017

(65) Prior Publication Data
US 2017/0357470 A1 Dec. 14, 2017

(30) Foreign Application Priority Data

Jun. 13, 2016 (JP) .................................. 2016-116921

(51) Int. Cl.
H04N 1/04 (2006.01)
G06F 3/12 (2006.01)
G03G 15/00 (2006.01)
G03G 15/36 (2006.01)

(52) U.S. Cl.
CPC ....... *G06F 3/1251* (2013.01); *G03G 15/5087* (2013.01); *G03G 15/652* (2013.01); *G06F 3/1207* (2013.01); *G06F 3/1208* (2013.01); *G06F 3/1219* (2013.01); *G06F 3/1282* (2013.01); *G03G 15/36* (2013.01); *G03G 2215/00021* (2013.01); *G06F 3/1258* (2013.01); *G06F 3/1267* (2013.01)

(58) Field of Classification Search
CPC .... G06F 3/1261; G06F 3/1207; G06F 3/1267; G06F 3/1258

USPC ........................................................ 358/471
See application file for complete search history.

(56) References Cited

U.S. PATENT DOCUMENTS

| 7,273,322 B1 | 9/2007 | Torii et al. |
| 2014/0253621 A1* | 9/2014 | Sakurada ............... B41J 2/2132 347/15 |
| 2015/0062225 A1* | 3/2015 | Sakamoto ............ B41J 2/04501 347/14 |

FOREIGN PATENT DOCUMENTS

JP  2008-015609 A  1/2008

* cited by examiner

*Primary Examiner* — Houshang Safaipour
(74) *Attorney, Agent, or Firm* — Buchanan Ingersoll & Rooney PC

(57) ABSTRACT

An image forming system of an aspect of the present invention includes: a first image forming portion; a second image forming portion connected in series to the first image forming portion; and an assignment determining portion that determines an assignment of image formation of print data to the first image forming portion and the second image forming portion in accordance with contents of the print data. The first image forming portion forms a first image on the continuous sheet on the basis of the assignment determined by the assignment determining portion, and the second image forming portion forms a second image on a region which is different from a region where the first image is formed on the continuous sheet and which overlaps a non-printable region that is a region where the first image forming portion cannot print, on the basis of the assignment determined by the assignment determining portion.

15 Claims, 9 Drawing Sheets

FEEDING DIRECTION
(SUB-SCANNING DIRECTION)

FIG. 12 SHARED PRINTING (IN A CASE OF ONE COLUMN)

FIG. 13 SHARED PRINTING (IN A CASE OF TWO COLUMNS)

FIG. 14 SHARED PRINTING (IN A CASE OF THREE COLUMNS)

IMAGE FORMING SYSTEM

BACKGROUND OF THE INVENTION

Field of the Invention

The present invention relates to an image forming system that forms an image on a continuous sheet and particularly relates to a technology that repeatedly forms an image on a continuous sheet by a plurality of image forming apparatuses connected in series.

Description of the Related Art

In an image forming apparatus such as a printer that forms an image on a sheet, an image is generally formed on a sheet referred to as a cut sheet which is cut to a predetermined fixed size such as A4 and B4. On the other hand, in such a type of image forming apparatus, an image can be also formed on a lengthy sheet referred to as a roll sheet. Such a lengthy sheet is often used for applications of repeated printing of seal-form labels such as addresses, serial numbers, and product indication. Hereinafter, an image forming apparatus that prints a label will be described as a "label printing apparatus".

Regarding a printed matter output by the label printing apparatus, there are demands such as "printing of labels at equal intervals for post-processing (punching, pasting and the like)" and "shortening an inter-label distance as much as possible". Accordingly, there is conventionally used, as document data for offset, image data in which a plurality of labels is imposed at an inter-label distance of 0 mm. In addition, in an inkjet-type continuous sheet printing apparatus or the like, printing can be performed without any space between pages by processing such as stopping of page feeding or rewinding of the continuous sheet during printing.

There is disclosed, as a continuous sheet printing apparatus, for example, a tandem continuous printing apparatus that performs printing on a continuous sheet by two printing apparatuses (refer to Patent Literature 1, for example). The tandem continuous printing apparatus described in Patent Literature 1 uses a part of print data as page identification information in order to synchronize a page printed by a first printing apparatus with a page printed by a second printing apparatus, and the both pages are aligned on the basis of the page identification information.

RELATED ART DOCUMENT

Patent Document

Patent Literature 1: Japanese Patent Laid-Open No. 2008-15609

SUMMARY OF THE INVENTION

Problems to be Solved by the Invention

Incidentally, a limitation is that a continuous sheet printing apparatus of an electrophotographic system cannot stop sheet feeding during printing in order to avoid damage on a sheet caused by heat of a fixing device. Furthermore, in a general printing apparatus of the electrophotographic system, a gap is provided between sheets to be conveyed (between pages), and adjustment processing or the like such as realization of smooth sheet conveyance and color correction (for example, color correction and toner removal) has been performed by the space between pages. However, since the adjustment processing or the like having been conventionally executed between the pages cannot be executed in the continuous printing apparatus of the electrophotographic system, there has been necessity (limitation) of providing a region where print cannot be performed (non-printable region) as a region corresponding to the space between pages. Conventionally, printing with a space between pages of 0 mm cannot be performed due to the non-printable region.

The technology described in Patent Literature 1 is for aligning the pages printed by the first printing apparatus and the second printing apparatus, and does not refer to the limitation of the non-printable region in the continuous sheet printing.

The present invention has been made in view of the aforementioned circumstances and an object of the present invention is to form an image, without limitation, on a continuous sheet.

Means for Solving the Problem

An image forming system of an aspect of the present invention includes: a first image forming portion that forms an image on a continuous sheet; a second image forming portion that is connected to the first image forming portion in series and forms an image on the same surface as a surface on which the image by the first image forming portion is formed on the continuous sheet; and an assignment determining portion that determines an assignment of image formation of print data to the first image forming portion and the second image forming portion in accordance with contents of the print data.

The first image forming portion forms a first image on the continuous sheet on the basis of the assignment determined by the assignment determining portion, and the second image forming portion forms a second image on a region which is different from a region where the first image is formed on the continuous sheet and which overlaps a non-printable region that is a region where the first image forming portion cannot print, on the basis of the assignment determined by the assignment determining portion.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

Embodiments for putting the present invention into practice will be described below by referring to the attached drawings. Note that constituent elements having substantially the same functions or configurations in each figure are given the same reference numerals and duplicated explanation will be omitted.

1. First Embodiment

[Configuration of Entire System]

Figure 1:
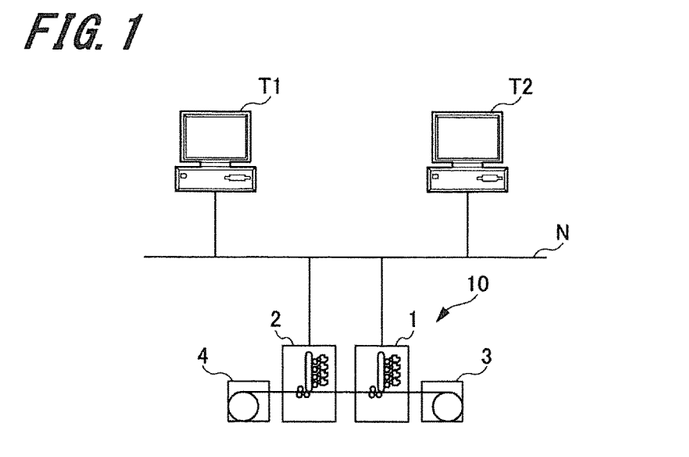
FIG. 1 is a view illustrating a configuration example of an entire system including an image forming system according to a first embodiment of the present invention.

FIG. 1 is a view illustrating a configuration example of an entire system including an image forming system according to a first embodiment. An image forming system 10 in FIG. 1 is obtained by application of the present invention to a roll printing apparatus that forms an image on a roll sheet.

The image forming system 10 is connected to a network N, and a plurality of client terminals T1 and 2 is connected onto the network N. The network N is a communication line such as a LAN (Local Area Network). The image forming system 10 is constituted by image forming apparatuses 1 and 2 that form images on the roll sheet, a sheet feeding device 3 that feeds out the roll sheet to the image forming apparatus 1, and a winding device 4 that winds the roll sheet. The image forming system 10 receives a print job sent from the client terminals T1 and T2 and performs image forming processing (hereinafter described as "printing processing" in some cases).

[Outline Configuration of Image Forming System]

Figure 2:
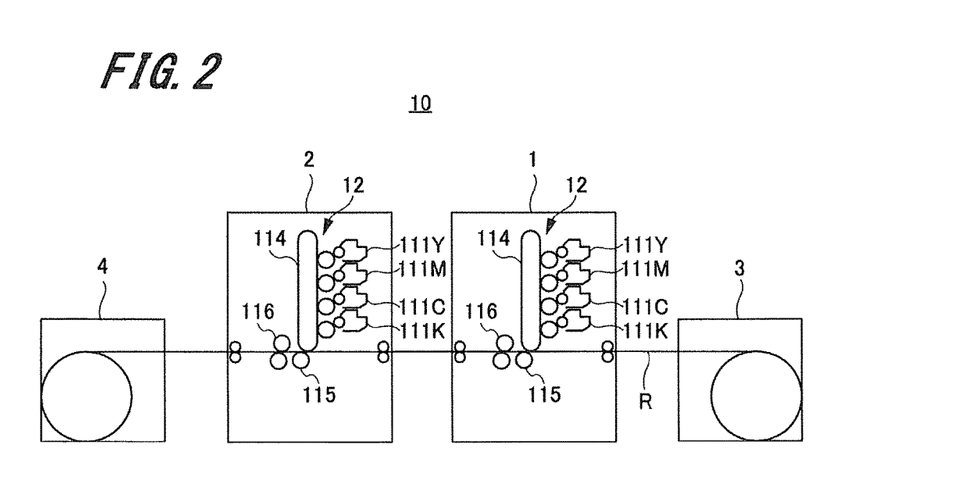
FIG. 2 is a schematic view illustrating a schematic configuration example of the image forming system according to the first embodiment of the present invention.

FIG. 2 is a schematic view illustrating a schematic configuration example of the image forming system 10.

The image forming system 10 is a tandem-type image forming system configured by connecting in series the two units of the image forming apparatuses 1 and 2. The image forming apparatus 2 is arranged on a downstream side of a roll sheet R in a feeding direction with respect to the image forming apparatus 1. First, an image is formed on a surface of the roll sheet R by the image forming apparatus 1, and then, an image is formed by the image forming apparatus 2 on the same surface as the surface of the roll sheet R on which the image by the image forming apparatus 1 is formed. In the Description, the image forming apparatus 1 (first image forming apparatus) that first forms an image on the roll sheet R is referred to as an upstream machine and then, the image forming apparatus 2 (second image forming apparatus) that forms an image on the roll sheet R is referred to as a downstream machine.

The image forming apparatuses 1 and 2 adopt an electrophotographic system in which an image is formed by using static electricity and are tandem-form color image forming apparatuses which overlap toner images of, for example, four colors of yellow (Y), magenta (M), cyan (C), and black (K). In the embodiment, printer engines 12 mounted on the image forming apparatuses 1 and 2 are color printer engines of the same specification.

Figure 3:
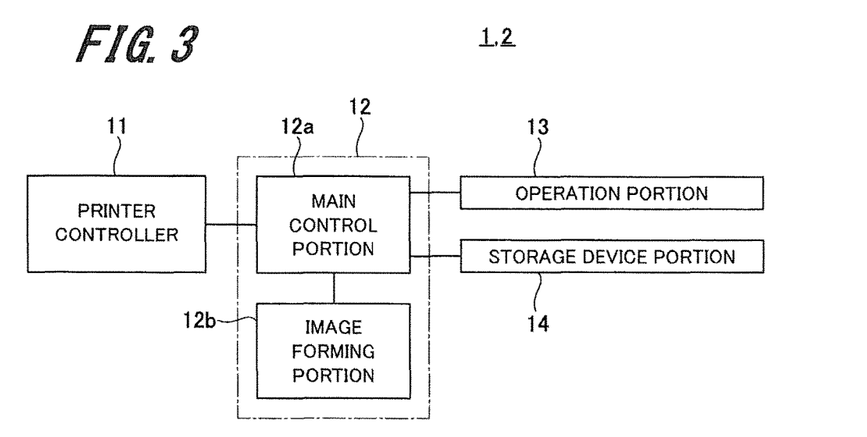
FIG. 3 is a block diagram illustrating a functional configuration example of the image forming apparatus according to the first embodiment of the present invention.

Each of the printer engines 12 included in the image forming apparatuses 1 and 2 includes a main control portion 12a and an image forming portion 12b as illustrated in, for example, FIG. 3. The image forming apparatuses 1 and 2 include four image forming units 111Y, 111M, 111C, and 111K in order to form a toner image of each color of, for example, yellow, magenta, cyan, and black. When the image forming units 111Y, 111M, 111C, and 111K are not distinguished from each other, they are referred to as an image forming unit 111 in some cases.

Each of the image forming units 111 has a charging portion, not shown, an LED writing unit (laser light source), a development portion, and a photoreceptor drum. Furthermore, the image forming apparatuses 1 and 2 include an intermediate transfer belt 114 to which an image formed on the photoreceptor drum of the image forming unit 111 is transferred, a secondary transfer portion 115, and a fixing portion 116 on a downstream side of the roll sheet R of the secondary transfer portion 115 in a feeding direction. A conveyance path is extended and connected to a discharge port on the downstream side of the fixing portion 116 in the feeding direction.

First, the image forming apparatus 1 charges the photoreceptor drum included in the image forming units 111 in respective colors and exposes a surface of the photoreceptor drum in accordance with a document image to thereby form an electrostatic latent image on the photoreceptor drum, in an image formation mode. Then, a toner is made to adhere to the electrostatic latent image on the photoreceptor drum corresponding to each of yellow, magenta, cyan, and black by the use of the development portion, to thereby form a toner image in each color. Next, the toner images formed on the photoreceptor drums of yellow, magenta, cyan, and black are sequentially subjected to primary-transfer to a surface of a rotatably driven intermediate transfer belt 114.

Subsequently, the toner image in each color having been subjected to primary transfer onto the intermediate transfer belt 114 is subjected to secondary-transfer onto the roll sheet R supplied from the sheet feeding device 3, by the secondary transfer portion 115 (secondary transfer roller). A color image is formed by secondary transfer of the toner image in each color on the intermediate transfer belt 114 onto the roll sheet R. The image forming apparatus 1 conveys the roll sheet R on which the color toner image is formed, to the fixing portion 116.

The fixing portion 116 is a device that performs fixing processing of the roll sheet R on which the color toner image is formed and which is supplied from the image forming apparatus 1. The fixing portion 116 pressurizes and heats the conveyed roll sheet R, and fixes the transferred toner image on the roll sheet R. The fixing portion 116 is constituted by, for example, a fixing upper roller and a fixing lower roller which are fixing members. The fixing upper roller and the fixing lower roller are arranged in a state of pressure-contact with each other, and a fixing nip portion is formed as a pressure-contact portion between the fixing upper roller and the fixing lower roller. A heating portion is provided inside the fixing upper roller, and a roller portion located on an outer peripheral portion of the fixing upper roller is heated by radiation heat from the heating portion.

The image forming apparatus 2 forms an image on the roll sheet R conveyed from the image forming apparatus 1 by the image forming portion 12b and discharges the roll sheet R to the winding device 4 by a conveyance path 21. The winding device 4 winds the discharged roll sheet R by a winding roller.

Note that, although the printer engines of the image forming apparatuses 1 and 2 have the same specification, the printer engines may have different specifications such as a color printer engine corresponding to or not corresponding to the feature, the color printer engine and a monochromic printer engine.

[Functional Configuration of Image Forming Apparatus]

FIG. 3 is a block diagram illustrating a functional configuration example of the image forming apparatuses 1 and 2.

The image forming apparatuses 1 and 2 include a printer controller 11, the printer engine 12, an operation portion 13, and a storage device portion 14, respectively. The printer engine 12 includes the main control portion 12a and the image forming portion 12b. The image forming portion 12b of the image forming apparatus 1 is an example of the "first image forming portion", and the image forming portion 12b of the image forming apparatus 2 is an example of the "second image forming portion".

The printer controller 11 receives a print job and generates raster data (data for image formation) from print data of the print job.

The main control portion 12a of the printer engine 12 is connected to each portion in the apparatus via a system bus and an interface, not shown, and controls an operation of each portion. For example, a CPU (Central Processing Unit) is used as the main control portion 12a. Alternatively, an MPU (Micro-Processing Unit) may be used as the main control portion 12a.

The image forming portion 12b of the printer engine 12 forms, on the roll sheet R, an image based on the data for image formation by the control of the main control portion 12a.

The operation portion 13 outputs an input signal according to an operation of a user or the like to the main control portion 12a. An input signal instructing start of the print job such as image formation processing is output to the main control portion 12a. A touch panel or the like is used for the operation portion 13. The operation portion 13 is generally configured as an operation display portion in which the touch panel and a display panel are laminated.

The storage device portion 14 stores a computer program executed by the main control portion 12a, received data, and the like.

[Hardware Configuration of Printer Controller]

Figure 4:
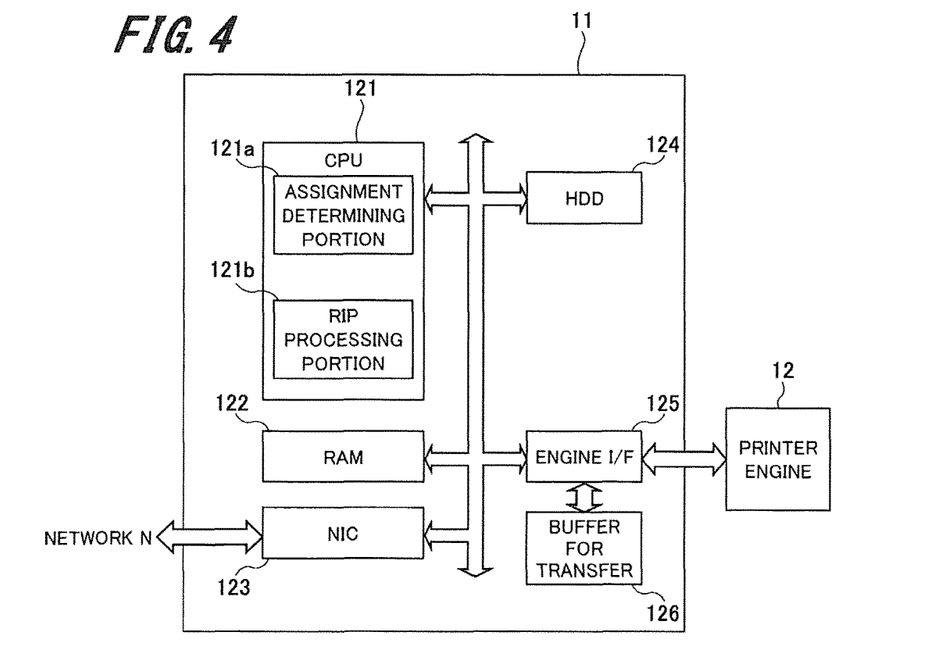
FIG. 4 is a block diagram illustrating a hardware configuration example of a printer controller according to the first embodiment of the present invention.

FIG. 4 is a block diagram illustrating a hardware configuration example of the printer controller 11.

The printer controller 11 includes a CPU 121, a RAM (Random Access Memory) 122, an NIC (Network Interface Card) 123, an HDD 124, an engine I/F 125, and a buffer 126 for transfer, and each portion is connected via a system bus. Furthermore, the buffer 126 for transfer is connected to the engine I/F 125.

The CPU 121 (control portion) is connected to each portion in the printer controller 11 via the system bus and controls an operation of each portion. The CPU 121 constitutes the control portion together with the RAM 122. The CPU 121 performs assignment determination processing, RIP (Raster Image Processor) processing and the like on the print data input from the client terminals T1 and T2.

RAM 122 temporarily stores data required for each processing by the CPU 121.

The HDD 124 records a program or the like for the CPU 121 to perform processing or control.

The NIC 123 is an example of a communication interface and performs processing of data transmission/reception between the client terminals T1 and t2 via the network N.

The engine I/F 125 performs processing of data transmission/reception on the printer engine 12. The buffer 126 for transfer is a buffer that temporarily stores the data for image formation in order to transfer the data for image formation to the printer engine 12.

The CPU 121 will be further explained. The CPU 121 includes at least an assignment determining portion 121a and an RIP processing portion 121b. The assignment determining portion 121a only needs to be provided at least in the image forming apparatus 1 which is the upstream machine, but may be provided in both the upstream machine and the downstream machine. Functions of respective portions of the CPU 121 are realized by execution of a program read out by the CPU 121 from the HDD 124.

The assignment determining portion 121a determines assignment (print assignment) of image formation of the print data to the image forming apparatus 1 and the image forming apparatus 2 in accordance with contents of the print data. Namely, the assignment determining portion 121a determines which of the image forming apparatus 1 and the image forming apparatus 2 performs formation of an image of an object included in the print data in accordance with a standard that will be described later. The contents of the print data are forms of arrangement and a size of the object included in the print data (for repeated printing). The assignment determining portion 121a sends information (division information) for dividing a plurality of objects of the print data to the RIP processing portion 121b on the basis of determined assignment contents. Print regions of the print data (or regions where the objects are arranged) are substantially divided by the assignments into a first region where image formation is performed by the image forming apparatus 1 and a second region where image formation is performed by the image forming apparatus 2.

The RIP processing portion 121b generates raster data (data for image formation) for the image forming apparatuses 1 and 2 by performing rasterization processing (RIP processing) by the use of the print data and the division information which are input from the assignment determining portion 121a, and outputs the data to the engine I/F 125. The data for image formation includes, for example, a tag bit plane, a Y-plane for yellow, a M-plane for magenta, a C-plane for cyan, and a K-plane for black. These tag bit plane, Y-plane, M-plane, C-plane, and K-plane are output to the corresponding image forming units 111Y, 111M, 111C, and 111K together with output setting included in the print job. A tag bit corresponding to an object type (character object, figure object, or an image object) in each region of the print data is given to the tag bit plane.

In the present embodiment, the printer controller 11 is constituted as a separate body from the printer engine 12, but has a configuration in which the same function as that of the printer controller 11 is operated by the main control portion 12a of the printer engine 12. Furthermore, the printer controller 11 may be a separate device from the image forming apparatuses 1 and 2.

Moreover, in the present embodiment, the printer controller 11 employs a system in which the raster data for the upstream machine and for the downstream machine is generated on the upstream machine side and the raster data for the downstream machine is sent from the upstream machine to the downstream machine, but may employ a method of assigning generation of the raster data to the upstream machine side and the downstream machine side. When, for example, the generation of the raster data is assigned to the upstream machine and the downstream machine, the downstream machine acquires the print data and information relating to the assignment from the upstream machine, and the downstream machine generates the raster data for the downstream machine on the basis of that. Alternatively, the downstream machine may acquire the print data after division from the upstream machine and perform rasterization processing on the print data as it is.

[Software Configuration of Client Terminal]

Figure 5:
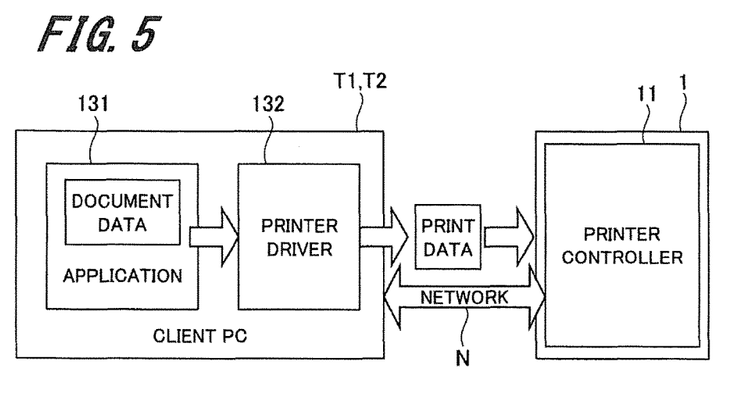
FIG. 5 is a schematic view illustrating a configuration example of software of a client terminal.

FIG. 5 is a schematic view illustrating a configuration example of software of the client terminals T1 and T2.

An application 131 for editing, browsing and the like of document data and a printer driver 132 that performs printing operate on the client terminals T1 and T2. The printer driver 132 performs setting required for printing and generates the print data in accordance with a print instruction from the application 131. Then, the printer driver 132 transmits the generated print data to the printer controller 11 via a network I/F, not shown, such as the NIC. The print data is PDL (Page Description Language) data described in a language (PCL (Printer Control Language), PostScript or the like) which is readable by the printer engine 2.

[Outline of Processing of Print Data]

Figure 6:
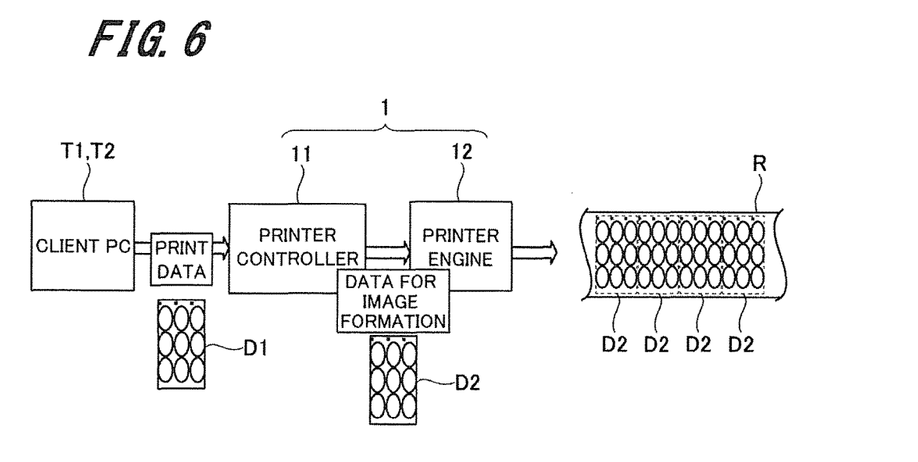
FIG. 6 is a schematic view illustrating processing of print data received in an image forming apparatus according to the first embodiment of the present invention.

FIG. 6 is a schematic view illustrating processing of the print data received in the image forming apparatus 1.

Print data D1 transmitted from the client terminals T1 and T2 to the image forming apparatus 1 is converted to data D2 for image formation in the printer controller 11. The data D2 for image formation is transmitted to the printer engine 12, and the printer engine 12 (image forming portion 12b in FIG. 3) repeatedly prints, on the roll sheet R, a designated number of images (for example, labels) on the basis of the data D2 for image formation. A plurality of pages is printed on the roll sheet R in the case of the plurality of pages of the print data. Also in the image forming apparatus 2, the same applies to printing of an image on the roll sheet R on the basis of the data for image formation generated from the print data.

[Example of Print Data]

Figure 7:
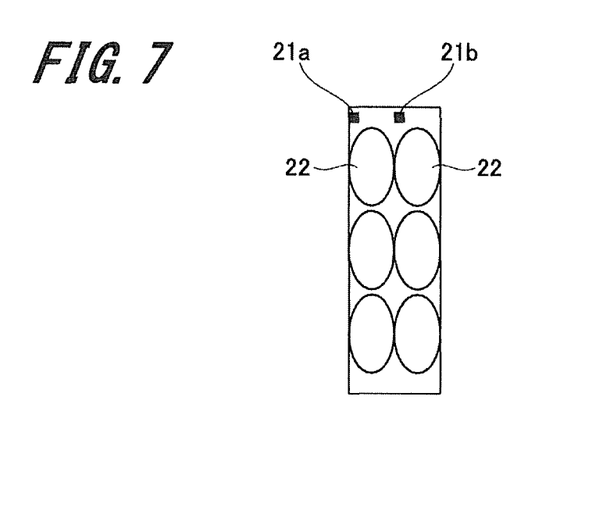
FIG. 7 is a view illustrating an example of document data used in label printing.

FIG. 7 is a view illustrating an example of the print data to be used in label printing.

In the label printing, printing is performed on the basis of the print data in which a plurality of label images (label objects) is imposed on one page. Hereinafter, the label image is simply described as a "label". In the print data, a mark referred to as an "eye mark" is generally arranged separately from the label. The eye mark is a reference position used for alignment by a post-processing machine that performs punching after the printing, and a black square is usually used. The imposition of the labels is performed in a case of the imposition by a user through the use of a commercial application, or in a case of the automatic imposition through the use of an exclusive application. At that time, arrangement of the labels and arrangement of the eye marks are made in accordance with specifications of the image forming apparatuses 1 and 2 and the post-processing machine.

In the example in FIG. 7, eye marks 21a and 21b are arranged at predetermined intervals on an upper portion of a print region of the print data. Then, three elliptic labels 22 are arranged in one column along a direction perpendicular to a sub-scanning direction (corresponding to a feeding direction) with the eye mark 21a as a base point. Similarly, the three labels 22 are arranged in one column along the direction perpendicular to the sub-scanning direction with the eye mark 21b as a base point. In the three labels 22 arranged with the eye mark 21a as the base point and the three labels 22 arranged with the eye mark 21b as the base point, the labels 22 facing each other in the sub-scanning direction abut against each other, and there is no gap between the labels 22 in the sub-scanning direction.

[Example of Non-Printable Region]

Figure 8:
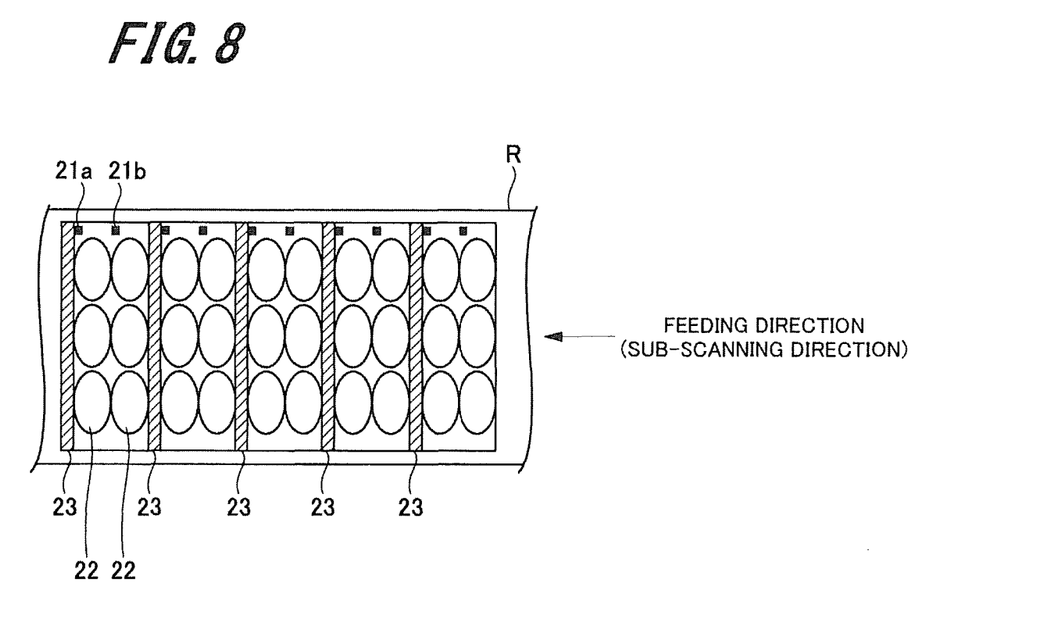
FIG. 8 is a view illustrating an example of a non-printable region in one unit of the image forming apparatus.

FIG. 8 is a view illustrating an example of a non-printable region in the image forming apparatus 1. Also in the image forming apparatus 2, the point that the non-printable regions are needed at a certain interval is the same.

A shaded portion between pages indicates a non-printable region 23 generated at equal intervals in the sub-scanning direction. In the image forming system (roll-sheet printing device) on a page-printer base, pages are continuously printed, but continuous printing without a gap between the pages cannot be performed in some cases due to conventional adjustment made between pages or a limitation of hardware (ASIC (Application Specific), for example) created on the premise of pages.

The limitation of hardware includes limitations of a memory, an HDD, an exclusive IC, a printing process and the like when an image is being printed. Conventionally, a count value of the number of images is held in the memory, and the count value is reset when a predetermined count value is reached, and for example, a non-printable region 23 having a predetermined width (for example, 1 mm) is provided between the pages for reset processing.

Due to these limitations, there have been circumstances in which an image cannot be continuously printed, and a space between the labels does not become 0 mm or equal in a printed matter. Note that one non-printable region 23 only needs to be set in units of several pages but is generally set between every space between pages, in consideration of processing in the post-processing machine in many cases. Furthermore, in recent variable printing, since contents of a page memory are updated in every page, the non-printable region 23 is set in every space between pages.

Note that an interval between the pluralities of non-printable regions 23 in the sub-scanning direction differs depending on a data size of the print data. The interval based on the data size is 400 mm depending on the print data, and when the data size becomes smaller, the interval becomes 300 mm or 200 mm, for example.

The present embodiment performs printing without limitation on a continuous sheet (for example, without a gap between the images in the feeding direction) by the use of an image forming apparatus of an electrophotographic system that cannot stop sheet-feeding during printing due to presence of the non-printable region, provision of the fixing portion, or the like. In the present embodiment, in order to solve such limitations, image formation of the print data is assigned to the image forming apparatus 1 and the image forming apparatus 2 in accordance with the contents of the print data.

[Assignment of Print Data with Respect to Sub-Scanning Direction]

Subsequently, there will be described a method for assigning the print data with respect to the sub-scanning direction by the assignment determining portion 121a. The assignment determining portion 121a determines assignments to the image forming apparatus 1 (upstream machine) and the image forming apparatus 2 (downstream machine) from arrangement information relating to a column of objects (for example, labels) included in one page of the print data.

(When Objects are in One Column)

Figure 9:
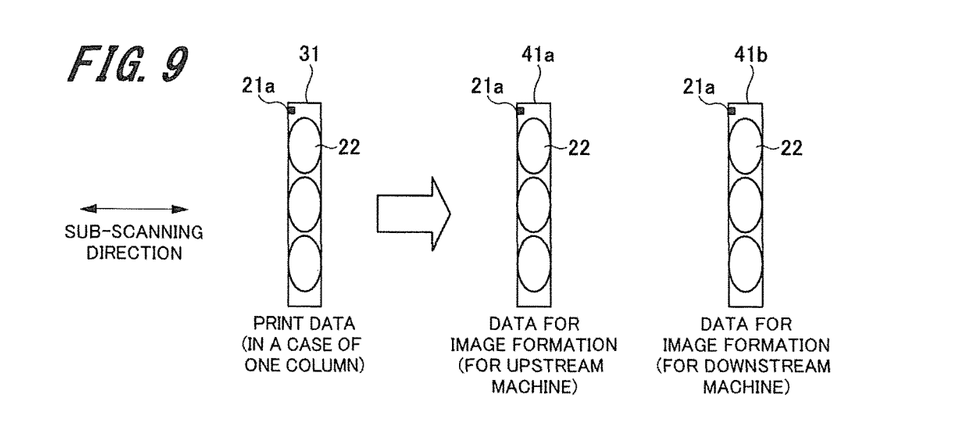
FIG. 9 is a view illustrating an assignment example when the number of columns of objects of the print data according to the first embodiment of the present invention is one.

FIG. 9 is an assignment example when the objects of the print data are in one column.

Print data 31 includes the eye mark 21a and the three labels 22 arranged in one column along the direction perpendicular to the sub-scanning direction. In the case, the assignment determining portion 121a uses the plurality of labels 22 of the print data 31 as they are without division, and the RIP processing portion 121b generates data 41a for image formation for the upstream machine and data 41b for image formation for the downstream machine.

As described above, when the assignment determining portion 121a determines that there is only one column of labels in one page from the arrangement information of the labels arranged on one page, the portion determines that images of the labels 22 are formed alternately by the upstream machine and the downstream machine.

(When Objects are in Two Columns)

Figure 10:
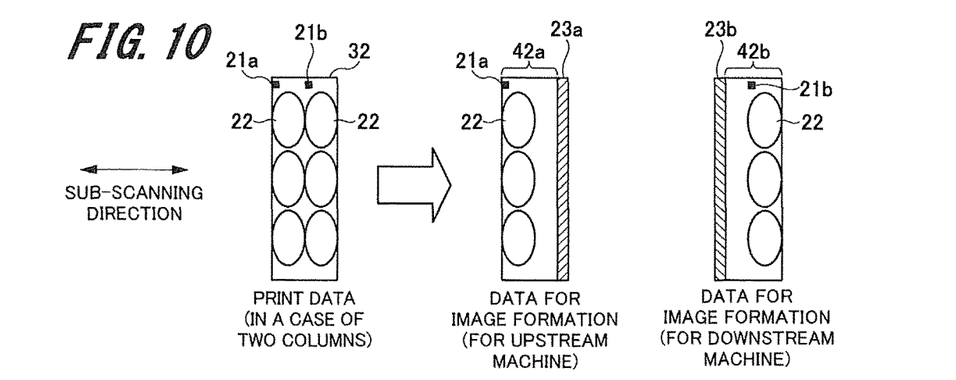
FIG. 10 is a view illustrating an assignment example when the number of columns of objects of the print data according to the first embodiment of the present invention is two.

FIG. 10 is an assignment example when the objects of the print data are in two columns.

The print data 32 includes the eye marks 21a and 21b and six labels 22 in total arranged in two columns along the direction perpendicular to the sub-scanning direction. In the case, the assignment determining portion 121a divides the plurality of labels 22 of the print data 32 with respect to the sub-scanning direction. As a result, the RIP processing portion 121b generates: data 42a for image formation for the upstream machine having the labels 22 on a first column with the eye mark 21a as a base point; and data 42b for image formation for the downstream machine having the labels 22 on a second column with the eye mark 21b as a base point.

As described above, the assignment determining portion 121a determines that printing is performed by the upstream machine for the first column and by the downstream machine for the second column, when the labels in two columns are arranged in one page of the print data. Note that, in FIG. 10, a non-printable region 23a of the upstream machine is illustrated in the data 42a for image formation, and a non-printable region 23b of the downstream machine is illustrated in the data 42b for image formation.

(When Objects are in Three Columns)

Figure 11:
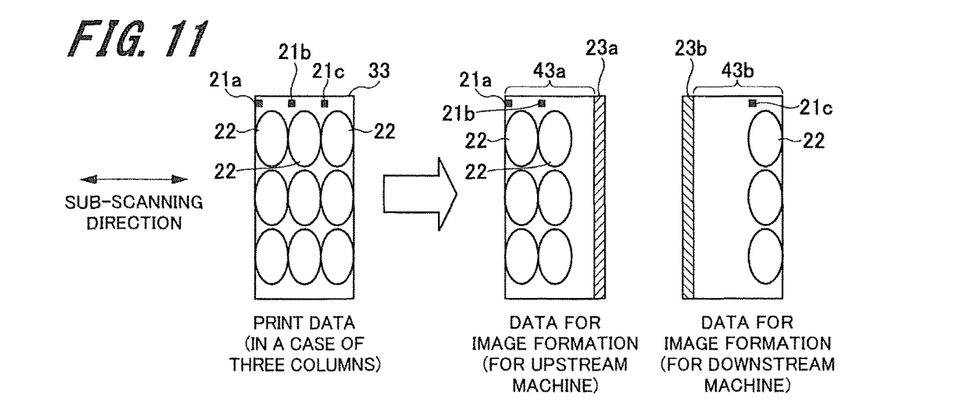
FIG. 11 is a view illustrating an assignment example when the number of columns of objects of the print data according to the first embodiment of the present invention is three.

FIG. 11 is an assignment example when the objects of the print data are in three columns.

Print data 33 includes the eye marks 21a, 21b, and 21c and nine labels 22 in total arranged in three columns along the direction perpendicular to the sub-scanning direction. In the case, the assignment determining portion 121a divides the plurality of labels 22 of the print data 33 with respect to the sub-scanning direction. As a result, the RIP processing portion 121b generates: data 43a for image formation for the upstream machine having the labels 22 on the first column and the second column with the eye marks 21a and 21b as base points; and data 43b for image formation for the downstream machine having the labels 22 on a third column with the eye mark 21c as a base point.

As described above, the assignment determining portion 121a determines that printing is performed by the upstream machine for the first column and the second column and by the downstream machine for the third column, when the labels in three columns are arranged in one page of the print data. Note that, in FIG. 11, the non-printable region 23a of the upstream machine is illustrated in the data 43a for image formation, and the non-printable region 23b of the downstream machine is illustrated in the data 43b for image formation.

When the number of columns of the objects in one page is four or more, the assignment determining portion 121a divides the plurality of objects in the print data as appropriate in accordance with the number of columns with respect to the sub-scanning direction, and thus the printing is performed by being assigned to the upstream machine and the downstream machine.

Determination of the number of columns of the labels may be made by a method of determination from the arrangement information of the objects of the print data (PDL data level) or by a method of determination by data for image formation after the rasterization processing. Alternatively, there may be employed a method in which the number of rows is determined by an application on the client terminals T1 and T2 sides and thus the print data is assigned.

[Example of Shared Printing]

(When the Number of Objects is in One Column)

Figure 12:
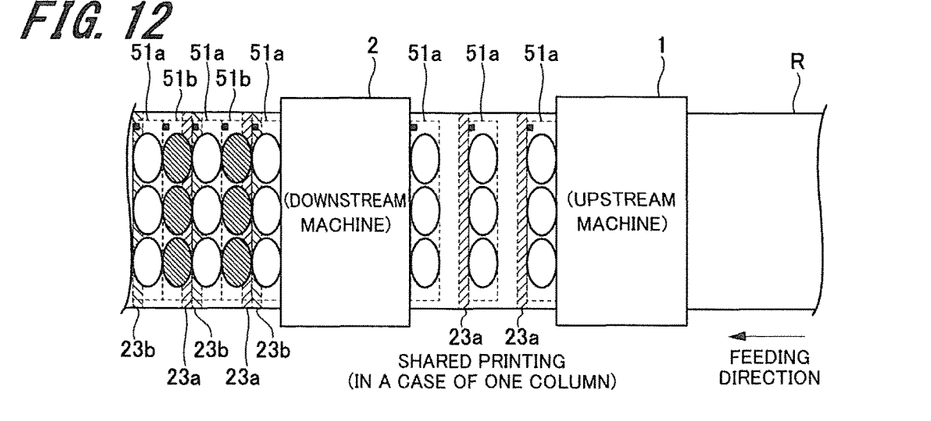
FIG. 12 is a view illustrating an example of shared printing of the image forming system based on the print data (one column) in FIG. 9.

FIG. 12 is a view illustrating an example of shared printing of the image forming system 10, based on the print data 31 (one column) in FIG. 9. The image forming apparatuses 1 and 2 form label images based on the object of the data for image formation. The label image is described simply as a "label" in some cases.

The image forming portion 12b of the image forming apparatus 1 (upstream machine) repeatedly performs assigned printing of the labels 22 on the first column on the basis of the data 41a for image formation (FIG. 9). The roll sheet R on which the label image is formed by the image forming apparatus 1 is fed to the image forming apparatus 2 (downstream machine) as it is. The image forming portion 12b of the downstream machine repeatedly performs assigned printing of the labels 22 on the second column on the basis of the data 41b for image formation (FIG. 9). The downstream machine adjusts a print position on the basis of the eye mark 21a printed by the upstream machine and forms a label image in a region 51b different from a region 51a on which the label image is formed by the upstream machine and at a position overlapping the non-printable region 23a of the upstream machine. Conversely, the region 51a in which the label image of the upstream machine is formed is located at a position overlapping the non-printable region 23b of the downstream machine.

(When Objects are in Two Columns)

Figure 13:
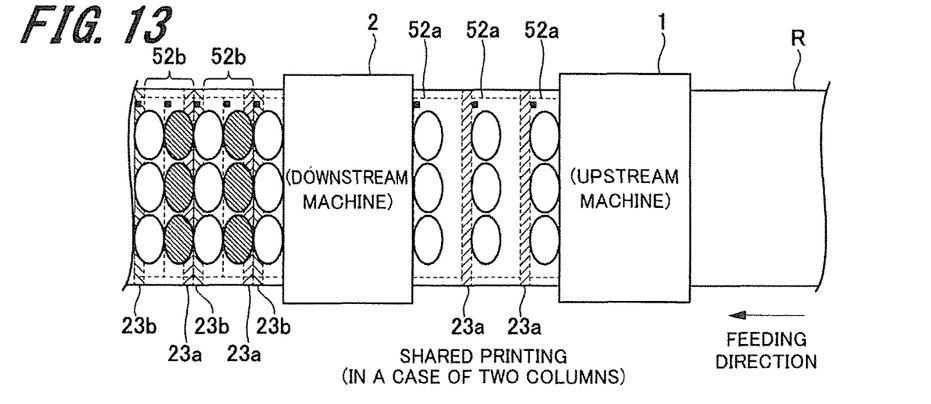
FIG. 13 is a view illustrating an example of shared printing of the image forming system based on the print data (two columns) in FIG. 10.

FIG. 13 is a view illustrating an example of shared printing of the image forming system 10, based on the print data 32 (two columns) in FIG. 10.

The upstream machine repeatedly performs assigned printing of the labels 22 on the first column on the basis of the data 42a for image formation (FIG. 10). The downstream machine forms label images on the second column in a region 52b different from a region 52a in which the label images on the first column are formed by the upstream machine and at position overlapping the non-printable region 23a of the upstream machine, on the basis of the data 42b for image formation (FIG. 9).

(When Objects are in Three Columns)

Figure 14:
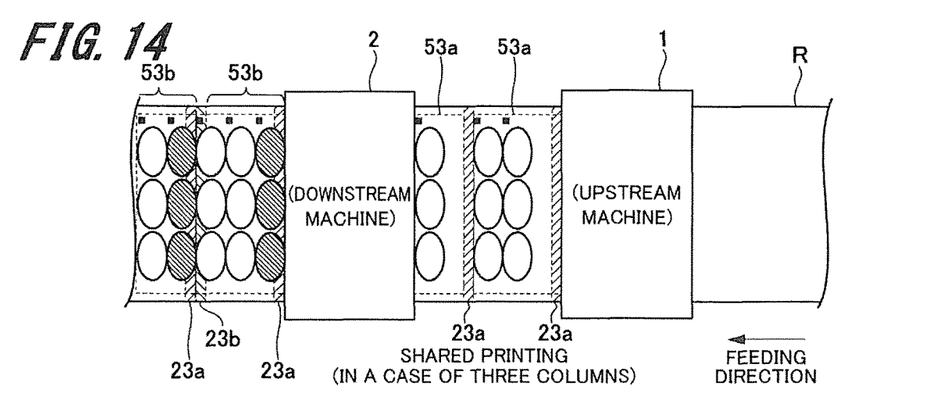
FIG. 14 is a view illustrating an example of shared printing of the image forming system based on the print data (three columns) in FIG. 11.

FIG. 14 is a view illustrating an example of shared printing of the image forming system 10, based on the print data 33 (three columns) in FIG. 11.

The upstream machine repeatedly performs assigned printing of the labels 22 on the first column and the second column on the basis of the data 43a for image formation (FIG. 11). The downstream machine forms label images on the third column in a region 53b different from a region 53a in which the label images on the first column and the second column are formed by the upstream machine and at positions overlapping the non-printable region 23a of the upstream machine, on the basis of the data 43b for image formation (FIG. 11).

[Effects of First Embodiment]

According to the first embodiment described above, the plurality of objects of the print data is divided in the sub-scanning direction in accordance with the contents of the print data, and image formation of the print data is assigned to the upstream machine (first image forming portion) and the downstream machine (second image forming portion) on the basis of the divided print data. The image can be formed on the roll sheet R without limitations through assignment of the printing processing based on the print data to the first image forming portion and the second image forming portion in accordance with the contents of the print data as above.

Furthermore, according to the first embodiment, since images of the objects can be formed without a gap between the pages, repeated images can be efficiently formed.

Moreover, the first embodiment is an example of forming an image for a label on a label sheet as a continuous sheet (roll sheet), but the label sheet is not limiting. In the first embodiment, there has been described a lengthy sheet (roll sheet) continuous without formation of perforation or the like as the continuous sheet, but there is not excluded a lengthy sheet in which a cutting line such as perforation or a folding line is formed in each page and each page is separable.

2. Second Embodiment

In a second embodiment, there will be described a method of assigning print data not in the sub-scanning direction, but in a main scanning direction. The assignment determining portion 121a determines assignments to the image forming apparatus 1 (upstream machine) and the image forming apparatus 2 (downstream machine) from the information relating to a size of the object included in one page of the print data.

[Assignment of Print Data with Respect to Main Scanning Direction]

Figure 15:
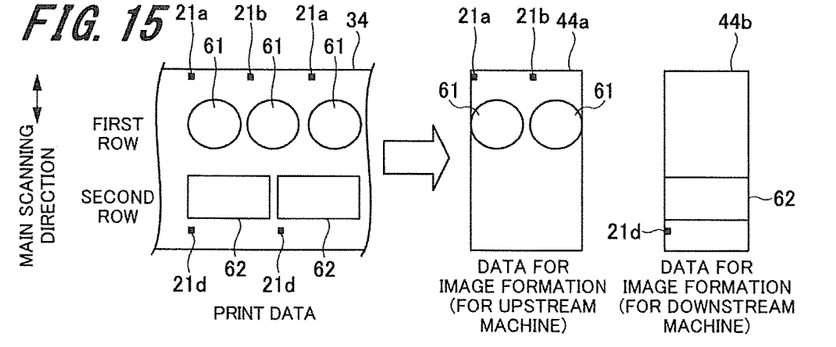
FIG. 15 is a view illustrating an assignment example when the number of rows of objects of the print data according to a second embodiment of the present invention is two.

FIG. 15 is an assignment example when there are two rows of the objects of the print data.

In FIG. 15, print data 34 includes three circular labels 61 arranged on a first row along the sub-scanning direction and the eye marks 21a, 21b, and 21a with respect to each of the labels 61. Furthermore, the print data 34 includes two square labels 62 arranged on a lower side (on a second row) of the three labels 61 on the first row arranged along the sub-scanning direction and an eye mark 21d with respect to each of the labels 62. The label 62 has a size in the sub-scanning direction larger than that of the label 61. Namely, in the print data 34, there are arranged the labels 61 and 62 having different sizes in the sub-scanning direction between the first row and the second row. In the case of the labels 61 and 62 having different sizes in the sub-scanning direction, even if the former labels 61 are printed by avoiding the non-printable region 23a of the upstream machine, the label 62 is overlapped with the non-printable region 23a in some cases.

Accordingly, when the size of the labels in one row of the print data is different from the size of the labels in another row in the sub-scanning direction, the assignment determining portion 121a divides the plurality of labels of the print data in the main scanning direction. The RIP processing portion 121b generates: data 44a for image formation for the upstream machine having the two labels 61 on the first row with the eye marks 21a and 21b as base points; and data 44b for image formation for the downstream machine having the labels 62 on the second row with the eye mark 21c as a base point, from the print data 34. Note that there are two labels 62 included in the data 44a for image formation due to an interval between the non-printable regions 23a.

As described above, when the sizes of the labels in the sub-scanning direction arranged in different rows (positions on the main scanning direction) of the print data are different, the assignment determining portion 121a determines that printing is performed by assigning the plurality of labels of the print data in the main scanning direction. When the number of rows of the labels is two as in FIG. 15, printing is performed by assignment in units of rows such as the first row by the upstream machine and the second row by the downstream machine.

[Example of Shared Printing]

Figure 16:
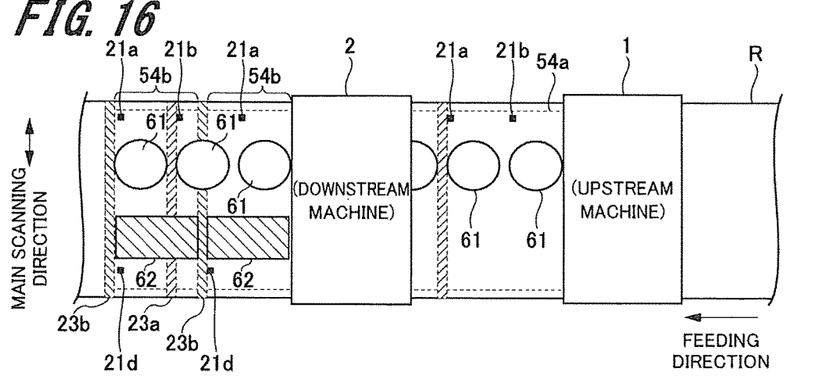
FIG. 16 is a view illustrating an example of the shared printing of the image forming system based on the print data (two rows) in FIG. 15.

FIG. 16 is a view illustrating an example of shared printing of the image forming system 10 based on the print data (two rows) in FIG. 15.

The image forming portion 12b of the upstream machine repeatedly performs assigned printing of the two labels 61 on the first row on the basis of the data 44a for image formation (FIG. 15). The roll sheet R on which the label image is formed by the upstream machine is fed to the downstream machine as it is. The image forming portion 12b of the downstream machine repeatedly performs assigned printing of the one label 61 (shaded portion) on the second row on the basis of the data 44b for image formation (FIG. 15). The downstream machine adjusts a printing position on the basis of the eye marks 21a and 21b printed by the upstream machine and forms an image of the label 62 in a region 54b different from a region 54a in which the label image is formed by the upstream machine and at a position overlapping the non-printable region 23a of the upstream machine. Conversely, the region 54a in which the image of the label 61 of the upstream machine is formed is located at a position overlapping the non-printable region 23b of the downstream machine.

[Effects of Second Embodiment]

According to the second embodiment described above, the plurality of objects of the print data is divided in the sub-scanning direction in accordance with the contents of the print data, and image formation of the print data is assigned to the upstream machine (first image forming portion) and the downstream machine (second image forming portion) on the basis of the divided print data. The image can be formed on the roll sheet R without limitations through assignment of the printing processing based on the print data to the first image forming portion and the second image forming portion in accordance with the contents of the print data as above.

Furthermore, according to the second embodiment, printing is possible even when the sizes of the labels in the sub-scanning direction arranged in different rows of the print data are different. Namely, the upstream machine and the downstream machine can form images different from each other on the basis of assignment determined by the assignment determining portion 121a.

Moreover, according to the second embodiment, since image formation with a gap between the objects being kept constant can be performed, repeated images can be efficiently formed. Accordingly, the requests of printing labels at equal intervals for post-processing (die-cutting and pasting) are met.

3. Third Embodiment

In a third embodiment, there will be described a method of assigning the print data with respect to the main scanning direction according to the second embodiment is applied, and a method of assigning only the object that cannot be printed by the image forming apparatus 1 (upstream machine) to the image forming apparatus 2 (downstream machine). The assignment determining portion 121a determines assignments to the upstream machine and the downstream machine with respect to the main scanning direction from a relationship between the object included in one page of the print data and the non-printable region.

[Assignment of Print Data on the Basis of Main Scanning Direction]

Figure 17:
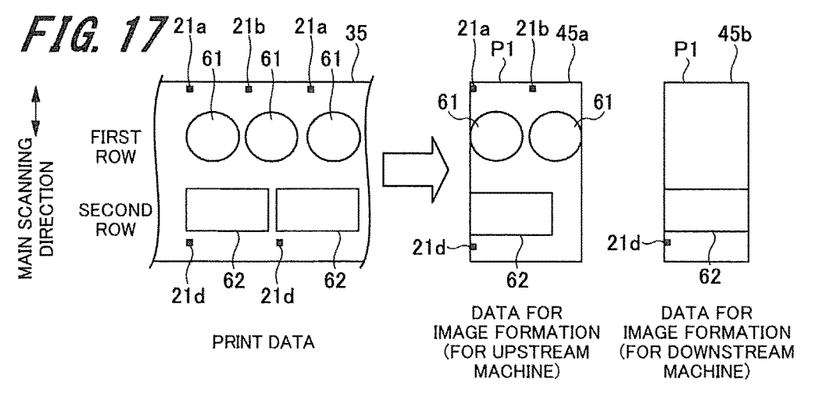
FIG. 17 is a view illustrating an example of assigning only the object that cannot be printed by an upstream machine to a downstream machine, according to a third embodiment of the present invention.

FIG. 17 is a view illustrating an example of assigning only the object that cannot be printed by the upstream machine to the downstream machine.

Print data 35 in FIG. 17 includes the same objects (labels 61 and 62) as those of the print data 34 in FIG. 15, and arrangement of the objects is the same.

In the present embodiment, when the sizes in the sub-scanning direction are different between the labels on one row of the print data and the labels on another row, the assignment determining portion 121a determines assignment of only the object that cannot be printed by the upstream machine to the downstream machine in assignment of the print data with respect to the main scanning direction. Accordingly, the RIP processing portion 121b generates data for image formation including the both labels with different sizes arranged on different rows for the upstream machine and generates data for image formation including only the object whose image cannot be formed by the upstream machine for the downstream machine.

For example, the RIP processing portion 121b generates data 45a for image formation for the upstream machine having: the two labels 61 on the first row with the eye marks 21a and 21b as base points; and the labels 62 on the second row with the eye mark 21d as a base point, from the print data 35. Apart from that, the RIP processing portion 121b generates data 45b for image formation for the downstream machine having only the labels 62 on the second row with the eye mark 21d as the base point. The data 45b for image formation is the same as the data 44b for image formation in FIG. 15.

When the sizes in the sub-scanning direction of the labels 61 and 62 arranged on different rows (positions on the main scanning direction) of the print data 35 are different, relative positions of the label 61 on the first row and the label 62 on the second row are gradually shifted at each page, and there is predicted a state where the label 62 is overlapped with the non-printable region 23a and its image cannot be formed. Accordingly, the assignment determining portion 121a assigns only the object that cannot be printed by the upstream machine, to the downstream machine.

[Example of Shared Printing]

Figure 18:
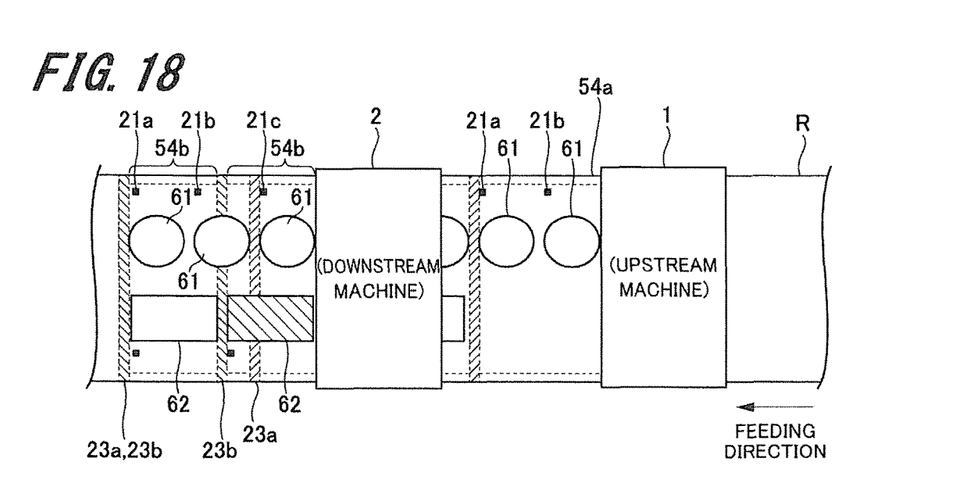
FIG. 18 is a view illustrating an example of shared printing of the image forming system based on the print data (only the region that cannot be printed by the upstream machine is divided) in FIG. 17.

FIG. 18 is a view illustrating an example of shared printing of the image forming system based on the print data (assignment of the object that cannot be printed by the upstream machine) in FIG. 17.

The image forming portion 12b (FIG. 3) of the upstream machine repeatedly performs assigned printing of the two labels 61 on the first row and the labels 62 on the second row on the basis of the data 45a for image formation (FIG. 17). The image forming portion 12b of the downstream machine repeatedly performs assigned printing of the one label 61 (shaded portion) on the second row on the basis of the data 45b for image formation (FIG. 17), but in the example, the upstream machine can print all the labels 61 and 62 for the first page. However, regarding the second page, since the upstream machine cannot print the label 62 on the second row, the downstream machine prints the label 62 (shaded portion).

The assignment determining portion 121a of the upstream machine notifies the printer controller 11 (FIG. 3) of the downstream machine, of information of the label 62 as the object for which image formation is not performed, after printing based on the data 45a for image formation is performed. Then, for example, the main control portion 12a of the downstream machine causes the image forming portion 12b to execute image formation of the label 62 based on the data 45b for image formation.

As described above, in the upstream machine, first, printing is performed on the basis of the first row of the data 45a for image formation and for the second row, only the label in the labels 61 not contained in the non-printable region 23a of the upstream machine is printed. Then, the label 61 not having been printed by the upstream machine is printed by the downstream machine.

[Example of Printed Matter]

Figure 19:
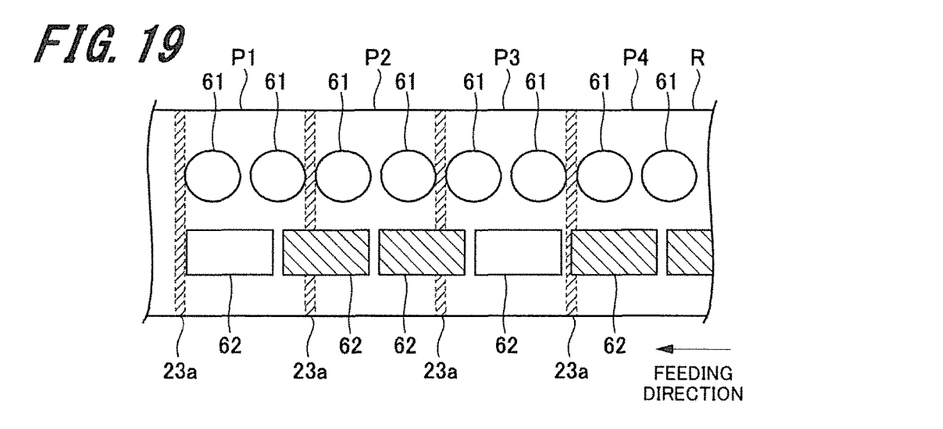
FIG. 19 is a view illustrating a printed matter by the shared printing of the image forming system in FIG. 18.

FIG. 19 is a view illustrating a printed matter by shared printing of the image forming apparatuses 1 and 2 in FIG. 18.

Figure 20:
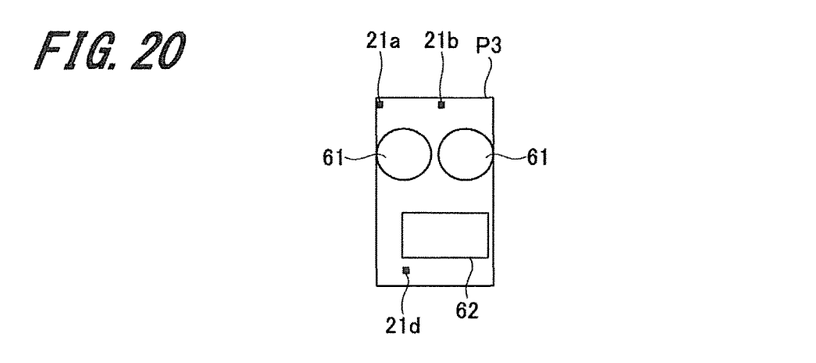
FIG. 20 is a view illustrating an example of data for image formation for the upstream machine generated by assignment in FIG. 17.

FIG. 20 is a view illustrating an example of data for image formation for the upstream machine generated by assignments in FIG. 17.

In the example, the upstream machine prints the two labels 61 on the first row from a page p1 to a page p4 and prints the labels 62 on the second row in the pages p1 and p3. As illustrated in FIG. 20, the data for image formation for the upstream machine of the page p3 includes the two labels 61 and one label 62 without defects. On the other hand, the downstream machine prints the second, third, and fifth labels 62 (shaded portions) from the left, which overlap the non-printable region 23a of the upstream machine.

[Effects of Third Embodiment]

According to the third embodiment described above, basically, the upstream machine (first image forming portion) performs image formation of all the objects included in the print data, and only the object that cannot be printed by the upstream machine since it enters in the non-printable region is assigned with respect to the main scanning direction, and image formation of the object is performed by the downstream machine (second image forming portion). The image can be formed on the roll sheet R without limitations through assignment of the printing processing based on the print data to the first image forming portion and the second image forming portion in accordance with the contents of the print data as above.

Furthermore, in the third embodiment, even in a case where the sizes of the labels in the sub-scanning direction arranged in different rows of the print data are different, printing can be performed similarly to the second embodiment.

Furthermore, according to the third embodiment, since image formation with the gap between the objects constant can be performed, repeated images can be efficiently formed similarly to the second embodiment.

[Shared Printing Processing of Image Forming System]

Subsequently, the shared printing processing by the image forming system 10 will be described.

Figure 21:
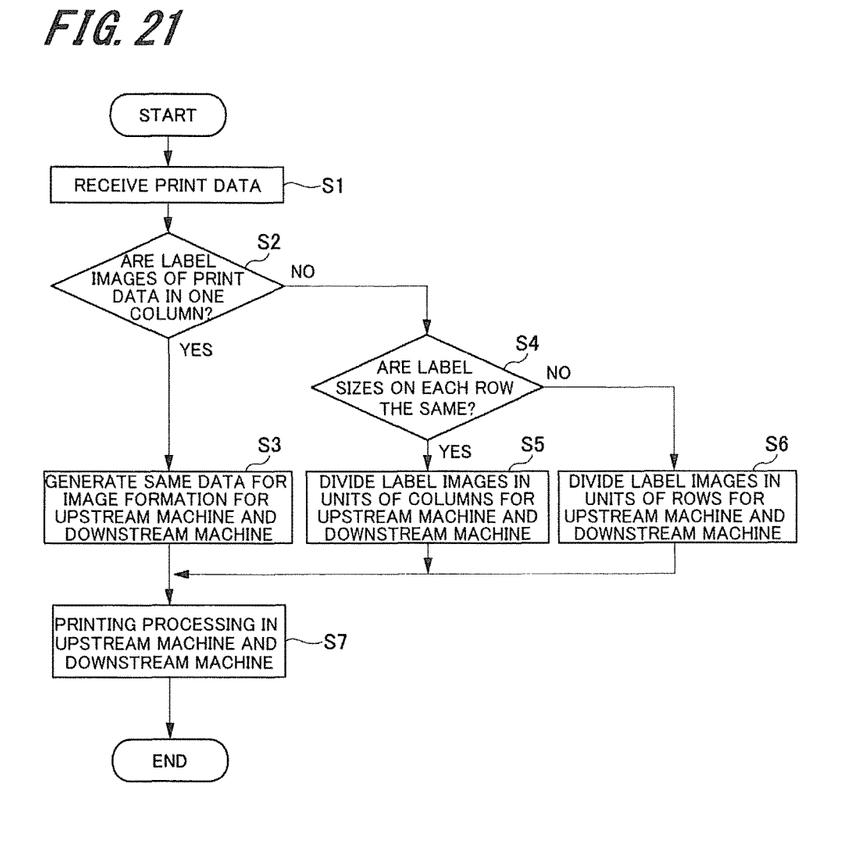
FIG. 21 is a flowchart illustrating a processing example in shared printing by the image forming system according to the first to third embodiments of the present invention.

FIG. 21 is a flowchart illustrating a processing example in the shared printing by the image forming system 10 according to the first to third embodiments. When the CPU 121 executes the program read out of the HDD 124, the processing in FIG. 21 is realized.

First, the client terminals T1 and T2 and the like transmit the print data to the printer controller 11 (FIG. 3) of the image forming apparatus 1 (upstream machine). The CPU 121 (FIG. 4) of the printer controller 11 monitors whether or not the print data has been transmitted from the client terminals T1 and T2 and the like, and receives the print data when the print data has been transmitted to the upstream machine (S1).

Next, the assignment determining portion 121a (FIG. 4) of the CPU 121 analyzes the print data and confirms whether or not the objects included in the print data, for example, labels are arranged in one column (S2).

Subsequently, at Step S2, when the labels are arranged in one column (YES at S2), (FIG. 9), the assignment determining portion 121a uses the labels of the print data 31 as they are without division. The RIP processing portion 121b generates the same data for image formation for the upstream machine and the downstream machine in accordance with an instruction of the assignment determining portion 121a (S3).

Then, the data for image formation generated at Step S3 is transmitted from the printer controller 11 of the upstream machine to the printer controller 11 of the downstream machine. In addition, the printer engines 12 of the upstream machine and the downstream machine receive the data for image formation from the corresponding printer controllers 11, respectively. Furthermore, the image forming portions 12b of the upstream machine and the downstream machine alternately execute the printing processing to the roll sheet R (S7) (FIG. 12).

On the other hand, when the labels are arranged in two or more columns at Step S2 (NO at S2), the assignment determining portion 121a determines whether or not the sizes of the labels on each row included in the print data are the same (S4).

When the sizes of the labels on each row are the same at Step S4 (YES at S4), the assignment determining portion 121a divides the labels of the print data in unit of columns (namely, with respect to the sub-scanning direction) (S5) (FIGS. 10 and 11). The RIP processing portion 121b generates the data for image formation for the upstream machine and the downstream machine in accordance with the instruction of the assignment determining portion 121a.

Then, the image forming portions 12b of the upstream machine and the downstream machine alternately execute the printing processing on the basis of the respective data for image formation (S7) (FIGS. 13 and 14).

Furthermore, when the sizes of the labels on each row are different at Step S4 (NO at S4), the assignment determining portion 121a divides the labels of the print data in units of rows (namely, with respect to the main scanning direction) (S6) (FIG. 15). The RIP processing portion 121b generates the data for image formation for the upstream machine and the downstream machine in accordance with the instruction of the assignment determining portion 121a.

Then, on the basis of the data for image formation for the upstream machine and the downstream machine, the rows are assigned to the upstream machine and the downstream machine, and the printing processing is executed (S7) (FIG. 16).

Note that, when there is a label that cannot be printed by the upstream machine at Step S6, the assignment determining portion 121a assigns the applicable label to the downstream machine (FIG. 17). The RIP processing portion 121b generates the data for image formation for the upstream machine and the downstream machine in accordance with the instruction of the assignment determining portion 121a. Then, the image forming portions 12b of the upstream machine and the downstream machine perform the printing processing on the basis of the respective data for image formation and execute the printing processing as appropriate by separation of the rows between the upstream machine and the downstream machine (S7) (FIG. 18).

4. Others

In the first to third embodiments described above, the image forming apparatus 1 and the image forming apparatus 2 are separate bodies, but the printer engine 12 of the image forming apparatus 1 and the printer engine 12 of the image forming apparatus 2 may be provided in one image forming apparatus. In addition, the printer controller 11 of each of the image forming apparatuses 1 and 2 may be provided outside the image forming apparatuses 1 and 2. Furthermore, the printer controller 11 of each of the image forming apparatuses 1 and 2 may be made common and stored in the image forming apparatus 1.

Moreover, the present invention is not limited to each of the exemplary embodiments describe above, and it is needless to say that other various application examples and modifications can be taken as long as the gist of the present invention described in claims is not departed.

For example, the exemplary embodiments described above explains in detail configurations of the apparatus and the system and specifically in order to explain the present invention so as to be easily understood and are not necessarily limited to those including all the configurations described. In addition, a part of the configuration of one exemplary embodiment can be replaced by the configuration of another exemplary embodiment. Furthermore, the configurations of another exemplary embodiment can be added to the configuration of one exemplary embodiment. Moreover, addition of another configuration to, deletion of, and replacement of, a part of the configuration of each exemplary embodiment are also possible.

Furthermore, a part of or the whole of each configuration, function, processing portion, processing means or the like described above may be realized with hardware by design or the like with, for example, an integrated circuit. Furthermore, each configuration, function or the like described above may be realized with software by interpreting and executing a program that realizes the respective functions by a processor. Information such as a program that realizes each function, a table, and a file can be stored in a recording device such as a memory, a hard disk, and an SSD (Solid State Drive) or a recording medium such as an IC card, an SD card, and a DVD.

Furthermore, control lines and information lines considered to be necessary for explanation are illustrated, and they are not necessarily all of the control lines or information lines required for a product. Actually, it may be considered that substantially all the configurations are connected to each other.

Moreover, in the Description, processing steps describing time-series processing include also processing executed in parallel or individually even if the processing is not performed in a time series (for example, parallel processing or processing by object), to say nothing of processing performed in a time series in the described order.

Although the present invention has been described and illustrated in detail, it is clearly understood at the same is by way of illustrated and example only and is not to be taken by way limitation, the scope of the present invention being interpreted by terms of the appended claims.

REFERENCE SIGNS LIST 1 image forming apparatus (upstream machine)
2 image forming apparatus (downstream machine)
10 image forming system
11 printer controller
12 printer engine
12a main control portion
12b image forming portion
21a, 21b, 21c, 21d eye mark
22 label
31 to 33 print data
34 print data
35 print data
41a, 41b, 42a, 42b, 43a, 43b data for image formation
44a, 44b data for image formation
45a, 45b data for image formation
61, 62 label
121 CPU
121a assignment determining portion
121b RIP processing portion
R roll sheet

What is claimed is:

1. An image forming system comprising:

a first image forming engine that forms an image on a continuous sheet;

a second image forming engine that is connected to the first image forming engine in series and forms an image on the same surface as a surface on which the image by the first image forming engine is formed on the continuous sheet; and a hardware processor that determines an assignment of image formation of print data to the first image forming engine and the second image forming engine in accordance with contents of the print data, wherein the first image forming engine forms a first image on the continuous sheet on the basis of the assignment determined by the hardware processor, and the second image forming engine forms a second image on a region which is different from a region where the first image is formed on the continuous sheet and which overlaps a non-printable region that is a region where the first image forming engine cannot print, on the basis of the assignment determined by the hardware processor; and wherein the second image is located at a position overlapping the non-printable region where the first image forming portion cannot print, and the first image is located at a position overlapping a non-printable region where the second image forming portion cannot print.

2. The image forming system according to claim 1, wherein when the objects included in one page of the print data are arranged only in one column in a main scanning direction perpendicular to a feeding direction of the continuous sheet, the hardware processor determines that image formation of the objects is alternately assigned to the first image forming engine and the second image forming engine.

3. The image forming system according to claim 2, wherein when the objects included in one page of the print data are arranged in two columns or more in the main scanning direction of the continuous sheet and when sizes in the feeding direction of the objects at different positions in the main scanning direction of the print data are the same, the hardware processor assigns the objects included in the print data with respect to a sub-scanning direction perpendicular to the main scanning direction.

4. The image forming system according to claim 2, wherein when the objects included in one page of the print data are arranged in two columns or more in the main scanning direction of the continuous sheet and when sizes in the feeding direction of the objects at different positions in the main scanning direction of the print data are different, the hardware processor assigns the objects included in the print data with respect to the main scanning direction.

5. The image forming system according to claim 4, wherein when there is the object whose image cannot be formed by the first image forming engine further on the basis of the print data, the hardware processor assigns only the relevant object to the second image forming engine.

6. The image forming system according to claim 1, wherein
an image forming position of the second image forming engine is adjusted on the basis of a mark for positioning formed on the continuous sheet by the first image forming engine.

7. The image forming system according to claim 3, wherein
the first image forming engine and the second image forming engine form images different from each other as the first image and the second image on the basis of the assignments determined by the hardware processor.

8. The image forming system according to claim 1, wherein
the first image forming engine and the second image forming engine form the images by an electrophotographic system.

9. The image forming system according to claim 1, wherein
the region on which the second image is formed both overlaps the non-printable region where the first image forming portion cannot print and also covers an additional region of the sheet.

10. The image forming system according to claim 1, wherein
the first and second images are formed on labels.

11. The image forming system according to claim 1, wherein
the first and second images are of a similar shape.

12. The image forming system according to claim 11, wherein
the first and second images are oval.

13. The image forming system according to claim 10, wherein
the first and second images are of a similar shape.

14. The image forming system according to claim 13, wherein
the first and second images are oval.

15. An image forming system comprising:
a first image forming engine that forms an image on a continuous sheet;
a second image forming engine that is connected to the first image forming engine in series and forms an image on the same surface as a surface on which the image by the first image forming engine is formed on the continuous sheet; and
a hardware processor that determines an assignment of image formation of print data to the first image forming engine and the second image forming engine in accordance with contents of the print data, wherein
the first image forming engine forms a first image on the continuous sheet on the basis of the assignment determined by the hardware processor, and the second image forming engine forms a second image on a region which is different from a region where the first image is formed on the continuous sheet and which overlaps a non-printable region that is a region where the first image forming engine cannot print, on the basis of the assignment determined by the hardware processor;
wherein
when the objects included in one page of the print data are arranged only in one column in a main scanning direction perpendicular to a feeding direction of the continuous sheet, the hardware processor determines that image formation of the objects is alternately assigned to the first image forming engine and the second image forming engine.

* * * * *